United States Patent [19]
Dalla Betta et al.

[11] Patent Number: 5,248,251
[45] Date of Patent: Sep. 28, 1993

[54] GRADED PALLADIUM-CONTAINING PARTIAL COMBUSTION CATALYST AND A PROCESS FOR USING IT

[75] Inventors: Ralph A. Dalla Betta, Mountain View, Calif.; Kazunori Tsurumi, Fujisawa, Japan; Toru Shoji, Sunnyvale, Calif.

[73] Assignee: Catalytica, Inc., Mountain View, Calif.

[21] Appl. No.: 856,462

[22] Filed: Mar. 24, 1992

Related U.S. Application Data
[62] Division of Ser. No. 617,973, Nov. 26, 1990.

[51] Int. Cl.$^5$ .............................................. F23D 3/40
[52] U.S. Cl. ........................................ 431/7; 431/328; 60/723
[58] Field of Search ...................... 431/7, 328; 60/723

[56] References Cited

U.S. PATENT DOCUMENTS

| | | | |
|---|---|---|---|
| 3,920,583 | 11/1975 | Pugh | 252/465 |
| 3,956,188 | 5/1976 | Hindin et al. | 252/465 |
| 3,966,391 | 6/1976 | Hindin et al. | 431/7 |
| 3,969,082 | 7/1976 | Cairns et al. | 23/288 |
| 3,970,435 | 7/1976 | Schultz et al. | 48/61 |
| 4,008,037 | 2/1977 | Hindin et al. | 431/7 |
| 4,019,969 | 4/1977 | Golebiowski et al. | 204/26 |
| 4,088,435 | 5/1978 | Hindin et al. | 431/7 |
| 4,279,782 | 7/1981 | Chapman et al. | 252/465 |
| 4,287,856 | 9/1981 | Enga | 122/4 |
| 4,318,828 | 3/1982 | Chapman | 252/465 |
| 4,331,631 | 5/1982 | Chapman et al. | 422/180 |
| 4,366,668 | 1/1982 | Madgavkar et al. | 60/39.06 |
| 4,414,023 | 11/1983 | Aggen et al. | 75/124 |
| 4,448,756 | 5/1984 | Hammerle et al. | 502/339 |
| 4,521,532 | 6/1985 | Cho | 502/439 |
| 4,601,999 | 7/1986 | Retallick et al. | 502/314 |
| 4,673,663 | 6/1987 | Magnier | 502/320 |
| 4,731,989 | 3/1988 | Furuya et al. | 60/39.05 |
| 4,742,038 | 5/1988 | Matsumoto | 502/302 |

(List continued on next page.)

FOREIGN PATENT DOCUMENTS
| | | |
|---|---|---|
| 0198948 | 11/1986 | European Pat. Off. |
| 60-51543 | 3/1983 | Japan . |
| 60-14938 | 1/1985 | Japan . |
| 60-14939 | 1/1985 | Japan . |

| | | | |
|---|---|---|---|
| 4,752,599 | 6/1988 | Nakamura et al. | 502/257 |
| 4,784,984 | 11/1988 | Yamanaka et al. | 502/439 |
| 4,831,009 | 5/1989 | Retallick | 502/334 |

(List continued on next page.)

OTHER PUBLICATIONS

Pennline, Henry W., Richard R. Schehl, and William P. Haynes, *Operation of a Tube Wall Methanation Reactor*, Ind. Eng. Chem. Process Des. Dev.: vol. 18, No. 1, 1979.

L. Louis Hegedus, "Temperature Excursions in Catalytic Monolitis" *AIChE Journal*, Sep. 1975, vol. 21, No. 5, 849-853.

Kee et al., "The Chemkin Thermodynamic Data Base", *Sandia National Laboratory Report No. SAND 87-8215* Apr., 1987, 5 pages.

Kubaschewski et al, "Metallurgical Thermo-Chemistry", *International Series on Materials Science and Technology*, 5th Edition, vol. 24, 382 (date unknown).

Hayashi et al., "Performance Characteristics of Gas Turbine Combustion Catalyst Under High Pressure", *Gas Turbine Society of Japan*, 1990, 18-69, 55.

*Primary Examiner*—Carroll B. Dority
*Attorney, Agent, or Firm*—Morrison & Foerster

[57] ABSTRACT

This invention is a graded catalyst comprising palladium and also a partial combustion process in which the fuel is partially combusted using that catalyst. The catalyst utilizes a catalytic support structure suitable for high flow rates of combustible gas mixtures through it. The catalyst is situated on the support so that in the flowing gas stream a leading portion of the support has a higher combustion activity, such as by a higher concentration of catalytic metal, than has the trailing portion. The combination of graded catalyst and support provides a low "light off" temperature for the combustible gas (only a low preheat temperature is needed to cause the combustion reaction to begin) and yet does not cause "hot spots" to occur because of excess activity. The combustion gas produced by the catalytic process may be at a temperature below the adiabatic combustive temperature, may be used at that temperature, or fed to other combustion stages for further use in a gas turbine, furnace, boiler, or the like.

23 Claims, 4 Drawing Sheets

U.S. PATENT DOCUMENTS

| | | | |
|---|---|---|---|
| 4,870,824 | 10/1989 | Young et al. | 60/723 |
| 4,893,465 | 1/1990 | Farrauto et al. | 60/39.02 |
| 5,010,051 | 4/1991 | Rudy | 502/339 |
| 5,026,611 | 6/1991 | Usui | 428/593 |

FOREIGN PATENT DOCUMENTS

| | | |
|---|---|---|
| 60-026211 | 2/1985 | Japan . |
| 60-51544 | 3/1985 | Japan . |
| 60-51545 | 3/1985 | Japan . |
| 60-54736 | 3/1985 | Japan . |
| 60-060411 | 4/1985 | Japan . |
| 60-60424 | 4/1985 | Japan . |
| 60-66022 | 4/1985 | Japan . |
| 60-147243 | 8/1985 | Japan . |
| 60-175925 | 9/1985 | Japan . |
| 60-196511 | 10/1985 | Japan . |
| 60-200021 | 10/1985 | Japan . |
| 60-202235 | 10/1985 | Japan . |
| 60-202745 | 10/1985 | Japan . |
| 60-205115 | 10/1985 | Japan . |
| 60-205116 | 10/1985 | Japan . |
| 60-222145 | 11/1985 | Japan . |
| 60-238148 | 11/1985 | Japan . |
| 61-033233 | 2/1986 | Japan . |
| 61-038627 | 2/1986 | Japan . |
| 61-147014 | 7/1986 | Japan . |
| 61-235609 | 10/1986 | Japan . |
| 61-237905 | 10/1986 | Japan . |
| 61-252408 | 11/1986 | Japan . |
| 61-252409 | 11/1986 | Japan . |
| 62-041511 | 2/1987 | Japan . |
| 62-046116 | 2/1987 | Japan . |
| 62-049125 | 3/1987 | Japan . |
| 62-079847 | 4/1987 | Japan . |
| 62-80419 | 4/1987 | Japan . |
| 62-80420 | 4/1987 | Japan . |
| 62-084215 | 4/1987 | Japan . |
| 62-112910 | 5/1987 | Japan . |
| 62-125210 | 6/1987 | Japan . |
| 62-158910 | 7/1987 | Japan . |
| 62-216642 | 9/1987 | Japan . |
| 62-261803 | 11/1987 | Japan . |
| 63-041720 | 2/1988 | Japan . |
| 63-080847 | 4/1988 | Japan . |
| 63-80848 | 4/1988 | Japan . |
| 63-80849 | 4/1988 | Japan . |
| 63-84635 | 4/1988 | Japan . |
| 63-190644 | 8/1988 | Japan . |
| 63-213723 | 9/1988 | Japan . |
| 1-139911 | 6/1989 | Japan . |
| 1-210707 | 8/1989 | Japan . |

GRADED PALLADIUM-CONTAINING PARTIAL COMBUSTION CATALYST AND A PROCESS FOR USING IT

This application is a division of application Ser. No. 07/617,973 filed Nov. 26, 1990.

FIELD OF THE INVENTION

This invention is a graded catalyst comprising palladium and also a partial combustion process in which the fuel is partially combusted using that catalyst. The catalyst utilizes a catalytic support structure suitable for high flow rates of combustible gas mixtures through it. The catalyst is situated on the support so that in the flowing gas stream a leading portion of the support has a higher combustion activity, such as by a higher concentration of catalytic metal, than has the trailing portion. The combination of graded catalyst and support provides a low "light off" temperature for the combustible gas (only a low preheat temperature is needed to cause the combustion reaction to begin) and yet does not cause "hot spots" to occur because of excess activity. The combustion gas produced by the catalytic process may be at a temperature below the adiabatic combustive temperature, may be used at that temperature, or fed to other combustion stages for further use in a gas turbine, furnace, boiler, or the like.

BACKGROUND OF THE INVENTION

With the advent of modern antipollution laws in the United States and in other countries around the world, significant and new methods of minimizing various pollutants are being investigated. The burning of fuel—be the fuel wood, coal, oil, or a natural gas—likely causes a majority of the pollution problems in existence today. Certain pollutants, such as $SO_2$, which are created as the result of the presence of a contaminant in the fuel source may be removed either by treating the fuel to remove the contaminant or by treating the exhaust gas eventually produced. Other pollutants such as carbon monoxide, which are created as the result of imperfect combustion, may be removed by post-combustion oxidation or by improving the combustion process. The other principal pollutant, $NO_x$ (an equilibrium mixture mostly of NO, but also containing very minor amounts of $NO_2$), may be dealt with either by controlling the combustion process to minimize $NO_x$ production or by later removal. Removal of $NO_x$, once produced, is a difficult task because of its relative stability and its low concentrations in most exhaust gases. One solution found in automobiles is the use of carbon monoxide to reduce $NO_x$ to nitrogen while oxidizing the carbon monoxide to carbon dioxide. However, in some combustion processes (such as gas turbines) the carbon monoxide concentration is insufficient to react with and remove the $NO_x$.

It must be observed that unlike the situation with sulfur pollutants where the sulfur contaminant may be removed from the fuel, removal of nitrogen from the air fed to the combustion process is impractical. Unlike the situation with carbon monoxide, improvement of the combustion reaction would likely increase the level of $NO_x$ produced due to the higher temperatures present in the combustion process.

Nevertheless, the challenge to reduce $NO_x$ remains and several different methods have been suggested. The $NO_x$ abatement process chosen must not substantially conflict with the goal for which the combustion gas was created, i.e., the recovery of its heat value in a turbine, boiler, or furnace.

Many recognize that a fruitful way to control $NO_x$ production is to limit the localized and bulk temperatures in the combustion zone to something less than 1800° C. See, for instance, U.S. Pat. No. 4,731,989 to Furuya et al. at column 1, lines 52–59 and U.S. Pat. No. 4,088,135 to Hindin et al. at column 12.

There are a number of ways of controlling the temperature, such as by dilution with excess air, controlled oxidation using one or more catalysts, or staged combustion using variously lean or rich fuel mixtures. Combinations of these methods are also known.

One widely attempted method is the use of multi-stage catalytic combustion. Most of these disclosed processes utilize multi-section catalysts of metal oxide on ceramic catalyst carriers. Typical of such disclosures are:

| Country | Document | 1st Stage | 2nd Stage | 3rd Stage |
| --- | --- | --- | --- | --- |
| Japan | Kokai 60-205129 | Pt-group/$Al_2O_3$&$SiO_2$ | La/$SiO_2.Al_2O_3$ | |
| Japan | Kokai 60-147243 | La&Pd&Pt/$Al_2O_3$ | ferrite/$Al_2O_3$ | |
| Japan | Kokai 60-66022 | Pd&Pt/$ZrO_2$ | Ni/$ZrO_2$ | |
| Japan | Kokai 60-60424 | Pd/— | CaO&$Al_2O_3$&NiO&NiO w/noble metal | |
| Japan | Kokai 60-51545 | Pd/* | Pt/* | $LaCoO_3$/* |
| Japan | Kokai 60-51543 | Pd/* | Pt/* | |
| Japan | Kokai 60-51544 | Pd/* | Pt/*base metal oxide/* | |
| Japan | Kokai 60-54736 | Pd/* | Pt or Pt-Rh or Ni base metal oxide or $LaCO_3$/* | |
| Japan | Kokai 60-202235 | $MoO_4$/— | $CoO_3$&$ZrO_2$& noble metal | |
| Japan | Kokai 60-200021 | Pd&$Al_2O_3$/+* | Pd&$Al_2O_3$/** | Pt/** |
| Japan | Kokai 60-147243 | noble metal/heat resistant carrier | ferrite/heat resistant carrier | |
| Japan | Kokai 60-60424 | La or Nd/$Al_2O_3$ 0.5% $SiO_2$ | Pd or Pt/NiO&$Al_2O_3$& CaO 0.5% SiO | |
| Japan | Kokai 60-14938 | Pd/? | Pt/? | |
| Japan | Kokai 60-14939 | Pd&Pt/refractory | ? | ? |
| Japan | Kokai 61-252409 | Pd&Pt/*** | Pd&Ni/*** | Pd&Pt/*** |
| Japan | Kokai 62-080419 | Pd&Pt | Pd,Pt&NiO | Pt or Pt&Pd |
| Japan | Kokai 62-080420 | Pd&Pt&NiO | Pt | Pt&Pd |
| Japan | Kokai 63-080848 | Pt&Pd | Pd&Pt&NiO | Pt or Pt&Pd |

-continued

| Country | Document | 1st Stage | 2nd Stage | 3rd Stage |
|---------|----------|-----------|-----------|-----------|
| Japan | Kokai 63-080849 | Pd,Pt,NiO/? | Pd&Pt(orNiO)/? | Pt or Pd&Pt/? |

*alumina or zirconia on mullite or cordierite
**Ce in first layer; one or more of Zr, Sr, Ba in second layer; at least one of La and Nd in third layer.
***monolithic support stabilized with lanthanide or alkaline earth metal oxide
Note:
the catalysts in this Table are characterized as "a"/"b" where "a" is the active metal and "b" is the carrier It is, however, difficult to control intermediate, or between-stage, temperatures in these processes. Since the object of the processes is to produce a maximum amount of heat in a form which can be efficiently used in some later process, the combustive steps are essentially adiabatic. Consequently, a minor change in any of fuel rate, air rate, or operating processes will cause significant changes in the inter-stage temperatures. Very high temperatures place thermal strain on downstream catalytic elements.

This list also makes clear that platinum group metals, including palladium, are considered useful in catalytic combustion processes. However, conventional catalytic combustion processes often mix the fuel and air and then pass this mixture over a catalyst with essentially complete combustion in the catalyst bed. This results in extremely high temperatures, typically 1100° C. to 1400° C. For this reason, much of the catalyst development work is directed at catalysts and supports that can withstand those high temperatures and yet remain active. Some have relied on process control schemes in which the flow rate of an intermediate stream of air or fuel is introduced between catalyst stages and is controlled based upon bulk gas temperature. Furuya et al., mentioned above, describes one approach in circumventing the problems associated with a high catalyst temperature through dilution of the fuel/air mixture with air fed to the catalyst so that the resulting mixture has an adiabatic combustion temperature of 900° C. to 1000° C. This mixture is passed through the catalyst and partial or complete reaction gives a maximum catalyst temperature less than 1000° C. and a gas temperature less than 1000° C. Additional fuel is added after the catalyst and homogeneous combustion of this mixture gives the required temperature, 1200° C. to 1500° C. This process, however, suffers from the need to add fuel at two stages and the requirements to mix this additional fuel with hot gases without obtaining a conventional high temperature diffusion flame and the associated production of $NO_x$.

The process of our invention mixes air and fuel at the beginning of the combustor in a ratio such that the final combustion temperature is, after further combustion step or steps, that required by some later process or device which recovers the heat from the combustive gas, e.g., a gas turbine. A typical mixture might be methane and air at a volume fuel/volume air ratio of 0.041 giving a final combustion temperature of 1300° C. with a preheat temperature of 350° C. This mixture passes over a catalyst and is only partially combusted with the catalyst limiting the maximum catalyst temperature to a level substantially less than the adiabatic combustion temperature of the gas or at a temperature to less than about the thermogravimetric analysis (TGA) transition temperature of the reaction:

$$PdO \rightarrow Pd + \tfrac{1}{2} O_2$$

at the partial pressure of oxygen present during the reaction. As a rule of thumb, this TGA transition temperature is about 780° C. to 800° C. in air at one atm and 930° C. to 950° C. in air at ten atm.

We have found that palladium catalysts can become unstable in partial oxidation operation: the oxidation reaction dies with time and the level of preheat temperature required for stable operation increases. The addition of a selected minor amount of platinum to the catalyst largely alleviates this instability problem.

The various features of this invention takes place by employing one or more of the following:

a. placement of the catalytic metals on the support so that a leading portion of the catalyst structure in the flowing gas stream contains catalytic material of higher activity,
b. use of palladium and optionally other metals such as platinum as the active catalytic metals,
c. use of a diffusion barrier applied over the catalyst surface to limit the rate at which the fuel diffuses to the catalyst and, therefore, limits the catalytic reaction rate and allows palladium to limit the maximum temperature, and/or
d. use of a metal substrate to support the catalyst layer and provide a catalyst structure very resistant to thermal shock.

The interconversion of palladium oxide and palladium at approximately 800° C. has been described previously, for example, by Furuya et al. in U.S. Pat. No. 4,731,989. However, this patent describes this interconversion as a disadvantage since the active palladium oxide species is converted to a less active palladium species thus preventing the combustion reaction from going to completion on the catalyst. The inventive process herein uses this palladium oxide-palladium interconversion process, optionally stabilized with another oxidative catalytic metal such as platinum, to limit the catalyst temperature and thereby permit the use of very high activity and stable catalysts.

By maintaining the catalyst temperature at substantially below the adiabatic combustion temperature, problems associated with thermal sintering of the catalyst, vaporization of the palladium, and thermal shock of the support can be minimized or eliminated.

The use of metal catalyst supports for platinum group metals has been suggested in passing. See, for instance, U.S. Pat. No. 4,088,435 to Hindin et al., "platinum group metals" at column 4, lines 63 et seq., and "the support may be metallic or ceramic . . . " at column 6, line 45. Conversely, the use of a platinum group alloy on a monolithic support as a combustion catalyst is suggested in U.S. Pat. No. 4,287,856 to Hindin et al. at column 1, line 65 et al. Other similar disclosures are found in the earlier U.S. Pat. Nos. 3,966,391; 3,956,188; and 4,008,037 all to Hindin et al. Platinum on a steel ("Fecralloy") support as a combustion catalyst for low heating value gas is suggested in U.S. Pat. No. 4,366,668 to Madgavkar et al.

Other disclosures of metals and metal supports used mainly for automotive catalytic converters include:

| Country | Document | Patentee |
| --- | --- | --- |
| U.S. | 3,920,583 | Pugh |
| U.S. | 3,969,082 | Cairns et al. |
| U.S. | 4,279,782 | Chapman et al. |
| U.S. | 4,318,828 | Chapman et al. |
| U.S. | 4,331,631 | Chapman et al. |
| U.S. | 4,414,023 | Aggen et al. |
| U.S. | 4,521,532 | Cho |
| U.S. | 4,601,999 | Retallick et al. |
| U.S. | 4,673,663 | Maqnier |
| U.S. | 4,742,038 | Matsumoto |
| U.S. | 4,752,599 | Nakamura et al. |
| U.S. | 4,784,984 | Yamanaka et al. |
| Great Britain | 1,528,455 | Cairns et al. |

As a group, these patents generally discuss ferritic catalyst supports upon which alumina is found as microcrystals, coatings, whiskers, etc. Many disclose that platinum group metals are suitably placed on those supports as catalysts. None suggest the ability of a catalyst comprising a palladium metal of various activities stably to limit the catalyst temperature, provide a "light off" temperature, and raise the catalyst temperature where hot spots would otherwise occur.

Moreover, in a practical sense the use of metal substrates has been limited to applications where the adiabatic combustion temperature is below 1100° C. or 1000° C. where the complete combustion of the fuel/air mixture will result in a substrate temperature that would not damage the metal. This limitation caps the final gas temperature that can be achieved or requires the use of staged fuel or air addition further complicating the combustor design. The use of the inventive process limits the metal substrate temperature to less than 850° C. at one atm pressure and to less than 950° C. at 16 atm pressure even for fuel/air mixtures with adiabatic combustion temperatures up to 1500° C.

This inventive process for stably limiting the substrate temperature also offers advantage for ceramic substrates since limiting the substrate temperature reduces thermal stress and failure due to thermal shock during start up and shutdown of the combustor. This protection is especially important for fuel/air ratios corresponding to adiabatic combustion temperatures of 1300° C. to 1600° C.

In summary, although the literature suggests various unrelated portions of the inventive process and the catalyst structure, none of these documents suggests that graded palladium-containing catalysts (either with or without a diffusion layer) can offer advantage by stably limiting the substrate temperature, providing a comparatively low light off temperature, and avoiding a internal hot spots or complete gas combustion inside the catalyst.

SUMMARY OF THE INVENTION

This invention is a graded catalyst comprising palladium and also a partial combustion process in which the fuel is partially combusted using that catalyst. The catalyst utilizes a catalytic support structure such as a metal or ceramic monolith suitable for high flow rates of combustible gas mixtures through it. By "graded" is meant that the catalyst on a leading portion of the support in the flowing gas stream has a higher activity than has the catalyst on a trailing portion of the support. The combination of graded catalyst and support provides a low "light off" temperature for the combustible gas (e.g., only a low preheat temperature is needed to cause the controlled combustion reaction to begin) and yet does not cause "hot spots" to occur because of excess activity. The combustion gas produced by the catalytic process may be at a temperature below the adiabatic combustion temperature, may be used at that temperature, or fed to other combustion stages for further use in a gas turbine, furnace, boiler, or the like.

DESCRIPTION OF THE INVENTION

This invention is a graded catalyst comprising palladium and also a partial combustion process in which the fuel is partially combusted using that catalyst. The catalyst utilizes a catalytic support structure such as a metal or ceramic monolith suitable for high flow rates of combustible gas mixtures through it. By "graded" is meant that the catalyst on a leading portion of the support has a higher activity than has the catalyst on a trailing portion of the support. The combination of graded catalyst and support provides a low "light off" temperature for the combustible gas (e.g., only a low preheat temperature is needed to cause the controlled combustion reaction to begin) and yet does not cause "hot spots" to occur because of excess activity. The combustion gas produced by the catalytic process may be at a temperature below the adiabatic combustion temperature, may be used at that temperature, or fed to other combustion stages for further use in a gas turbine, furnace, boiler, or the like.

Catalyst and Catalytic Structures

The graded catalyst contains mainly palladium and optionally an amount of another metal combustion catalyst such as one or more Group IB (silver or gold) or Group VIII noble metals (platinum, ruthenium, rhodium, iridium, or osmium).

Palladium is fairly active as a combustion catalyst at temperatures of 325° C. and lower and consequently is useful in a partial combustion process as a "light off" catalyst. As was discussed above, the catalytic activity of palladium as a fuel combustion catalyst is believed to be due to the presence of the oxide of palladium. The metal palladium does not appear to be a very active as a catalyst except at fairly high temperatures, e.g., substantially above 750° C. to 800° C. Palladium metal is readily oxidized to palladium oxide in the presence of excess oxygen at temperatures as low as 325° C. according to the equilibrium reaction:

$\frac{1}{2} O_2 + Pd \longleftrightarrow PdO.$

However, as the temperature rises, the equilibrium shifts to the left, i.e., the palladium oxide decomposes. This transition causes the reaction temperature to be self-limiting. At a pressure of one atmosphere of air, the oxidation goes readily up to a temperature of about 750° to 780° C., the palladium oxide becomes the lesser present species, and the reaction consequently slows.

The temperature at which palladium oxide converts to palladium depends in part on the oxygen partial pressure. The conversion temperature appears to be readily determinable through thermogravimetric analysis (TGA), a procedure that measures the weight loss of palladium oxide as the temperature increases. The transition point establishes the self-limiting substrate temperature for those operating conditions. A palladium catalyst used as a combustion catalyst will generally limit the catalyst substrate temperature to this TGA transition limiting temperature.

The use of palladium on some substrates, notably those containing alumina, often results in a partial combustion catalyst having an unpredictable life. The reason for the deactivation is unclear although the resulting decline in outlet temperature is quite pronounced. The effect is observed on both alumina coated metal supports and with neat alumina supports. The addition of a discrete amount of platinum to the palladium catalyst provides long term stability to the catalyst composition, does not cause "runaway" temperature increases as might be expected with the use of a platinum oxidation catalyst, does not substantially affect the desirable low "light off" temperatures found with palladium catalysts, and lowers the self-limiting temperature of the catalyst in a predictable and desirable fashion.

The addition of a high surface area support material coating other than alumina, such as zirconia, silica or a mixture to the support will result in similar stabilization effects.

The palladium metal is added in an amount sufficient to provide catalytic activity. The specific amount added depends on a number of requirements, e.g., the fuel used, economics, activity, life, contaminant presence, etc. The theoretical maximum amount of metal is likely enough to cover the maximum amount of support without causing undue metal crystallite growth and concomitant loss of activity. These clearly are competing factors: maximum catalytic activity requires higher surface coverage but higher surface coverage can promote growth between adjacent crystallites. Furthermore, the form of the catalyst support must be considered. If the support is used in a high space velocity environment, the catalyst loadings should be high to maintain sufficient conversion even though the residence time is low. Economics has, as its general goal, the use of the smallest amount of catalytic metal which will do the required task. The presence of contaminants in the fuel would mandate the use of higher catalyst loadings to offset deterioration in the catalyst due to deactivation. Finally, the metal amount also is also affected by the feed.

The overall palladium metal content of this catalyst composite is typically quite small, e.g., from 0.01% to about 25% by weight. We have found that the temperature at which the catalyst first becomes effective in combusting fuel introduced into the catalyst structure is dependent upon the activity of the catalyst, which in turn, may be dependent on a variety of catalyst parameters, e.g., metal concentration on the substrate, the microscopic form of the catalyst, the surface area of the catalyst, the presence of any diffusion barriers on the catalyst surface, the presence of catalyst poisons in the fuel on in the catalyst support, etc. We have also found that if a catalyst of excessive activity for the process is employed, the catalyst has a tendency locally to "over-oxidize" by forming "hot-spots" in the catalyst structure. Ideally, the activity of the catalytic material in the structure should be as high as is possible at each point along the catalyst structure to oxidize the fuel at a high rate, require a minimum amount of (or, ideally, no) preheat, not interfere with the tendency of the palladium to self-limit the catalyst structure temperature, and yet cause no hot-spots in the catalyst structure. Matching the point-to-point activity needs of the catalyst structure to these parameters is a difficult task. We have found that one solution by varying the activity of the catalytic metal along the axis of the catalyst structure from a higher concentration at the region of the catalyst where the fuel mixture first contacts the catalyst to a lower metal concentration where the gas is at the "self-limiting" temperature. Another solution we have found is to add a diffusion barrier to the downstream end of the catalyst structure.

The palladium may be incorporated onto the support in a variety of different methods using palladium complexes, compounds, or dispersions of the metal. The compounds or complexes may be water or hydrocarbon soluble. The palladium metal may be precipitated from solution. The liquid carrier generally needs only to be removable from the catalyst carrier by volatilization or decomposition while leaving the palladium in a dispersed form on the support. Examples of the palladium complexes and compounds suitable in producing the catalysts used in this invention are palladium chloride, palladium diammine dinitrite, palladium nitrate, palladium tetrammine chloride, palladium 2-ethyihexanoic acid, sodium palladium chloride, and a variety of other palladium salts or complexes. Although the chloride compounds produce catalysts which are typically quite active, chlorides are not an excellent choice when the catalyst is used in a combustor for a gas turbine. Chlorides, even in very small amounts, cause significant turbine blade and bucket corrosion. In addition, on metal substrates the chloride can include or enhance corrosion of the substrates. Consequently, nitrogen-containing palladium precursors are most desirable.

As mentioned above, the catalyst may contain another or adjunct combustion catalyst such as one or more Group IB (silver or gold) or Group VIII noble metal (platinum, ruthenium, rhodium, iridium, or osmium), desirably platinum, in an amount suitable for stabilizing the palladium in the catalyst composition. Molar ratios of palladium to Group IB or VIII noble metal between 0.50 and 25 are believed to be effective. Although the Group IB or VIII metal may be added by inclusion in the liquid carrier containing the palladium as a complex, compound, or metallic dispersion, we have found that the results are more predictable if the Group IB or VIII noble metal is added in a subsequent step. Examples of the Group IB or VIII noble metal complexes and compounds suitable in producing the catalysts used in this invention are platinum chloride, platinum diammine di-nitrite, platinum nitrate, platinum tetrammine chloride, sodium platinum chloride, and a variety of other Group IB or VIII noble metal salts or complexes.

Figure 1A:
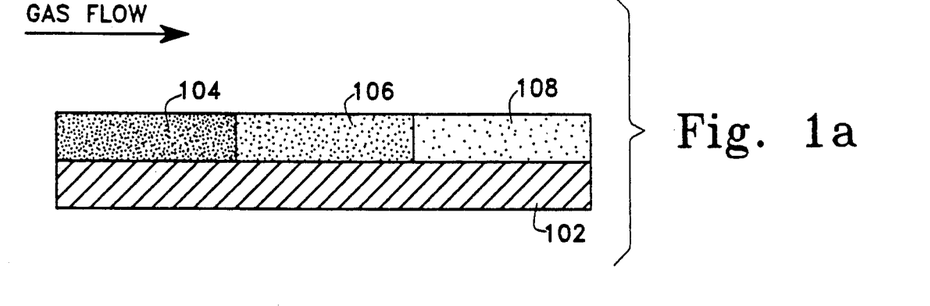
FIGS. 1(a)–1(d) and 2(a)–2(d) show schematic, cross section closeups of a number of catalysts within the scope of the invention.

The graded structure can be produced a number of different ways. As shown in FIG. 1, the substrate metal or ceramic (102) can be coated with three different catalysts (104, 106, and 108). Each catalyst has a different activity: catalyst 104 having the highest activity, catalyst 106 having an intermediate activity, and catalyst 108 having the lowest activity. Catalysts 104, 106, and 108 can be obtained by varying the loading of the active catalytic material, for instance, catalyst 104 would have 20% palladium, catalyst 106 would have 10% palladium, and catalyst 108 would have 5% palladium. Alternatively, the palladium dispersion could be varied with catalyst 104 having the highest dispersion and catalyst 108 the lowest dispersion.

Figure 1B:
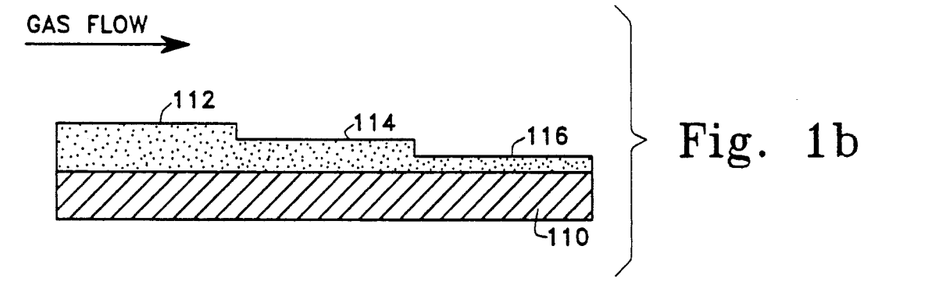

Another approach to a graded catalyst would be to use a washcoat containing both an oxidic material and a catalytic material but having a constant activity and to vary the thickness along the catalyst. In FIG. 1B, a constant activity catalytic washcoat is applied to the substrate (1 1 0) in a thick (of higher activity) layer at the inlet (1 12), thinner in the middle (1 14), and very thin at the outlet (1 16).

Figure 1C:
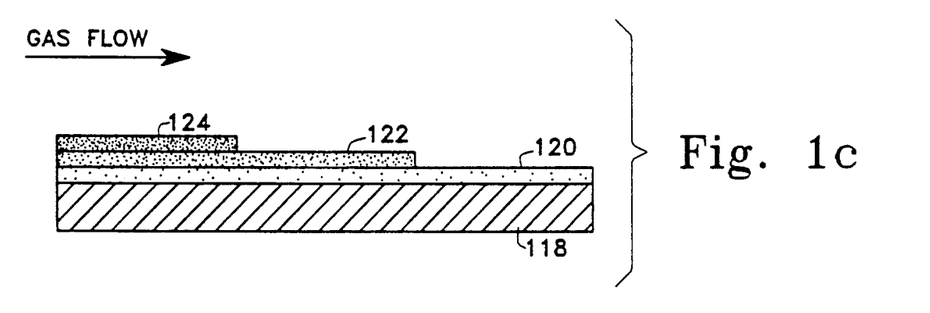
Figure 1D:
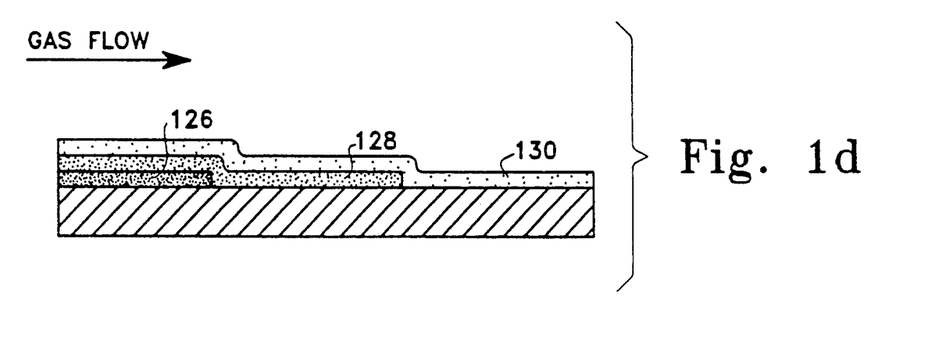
Figure 2A:
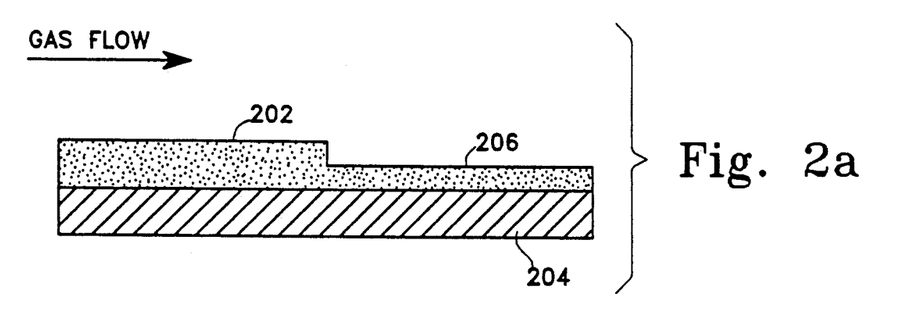
Figure 2B:
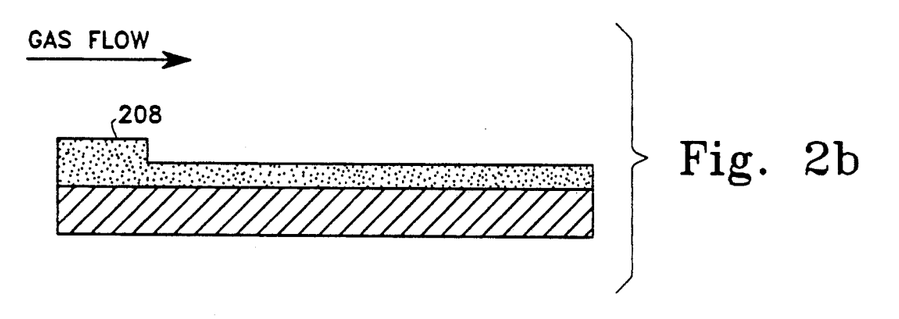
Figure 2C:
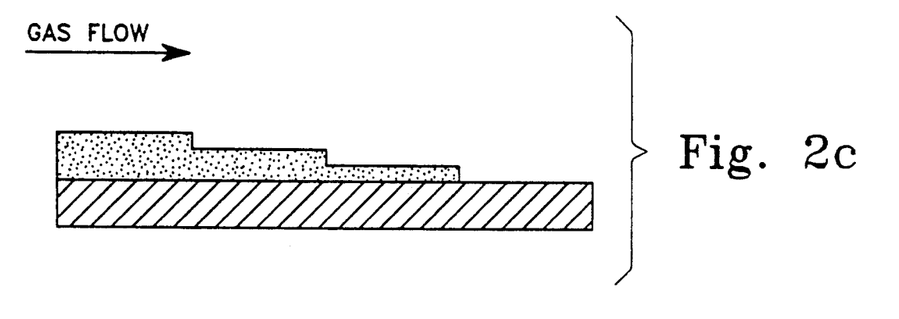
Figure 2D:
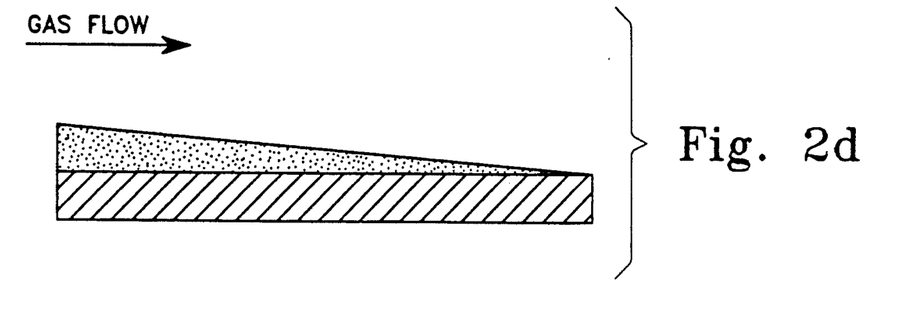

A third approach is to use catalytic washcoats of different activity as in FIG. 1(a) but apply these washcoats in overlapping layers as in FIG. 1(c) where the low activity catalytic washcoat (120) is applied over the entire substrate (118) followed by the medium activity washcoat covering a portion (122) of the substrate and finally the high activity washcoat (124) at the inlet only. An additional structure is shown in FIG. 1(d) where the high activity washcoat (126) is first applied at the inlet followed by the medium (128) and low activity washcoat (130).

The high, medium, and low activity washcoats can be produced by a variety of approaches. The active component (such as palladium) can be varied from a high concentration to a low concentration. Alternatively, the dispersion of the active palladium can be varied by using different preparation procedures or by heat treating the catalyst at different temperatures. Another procedure would be to vary the surface upon which the active component is deposited. For example, a palladium/Al$_2$O$_3$ or palladium/ZrO$_2$ catalyst using dimerent surface area Al$_2$O$_3$ or ZrO$_2$ supports would resoft in catalysts of different activity, the higher surface area support would have a higher activity.

These graded catalyst structures can be manufactured by several procedures. For example, the structure shown in FIG. 1(d) can be prepared on a ceramic honeycomb monolith by partially dipping the monolith in washcoat and blowing the excess out of the channels. Subsequently, the process is repeated by dipping further into the washcoat sol. This same general procedure can be used to prepare the structure found in FIG. 1(c). The same procedures can be applied to metal monoliths by rolling the metal foil into a spiral or folding the metal foil into the desired shape for dipping as described for the ceramic monolith.

An alternative approach would be to apply the graded catalyst layers to a suitably corrugated metal foil that is then rolled into a spiral structure to form the final catalyst unit. The washcoat can be sprayed or painted onto the metal foil surface or applied by other known obvious techniques such as by chemical vapor deposition, sputtering, etc. To achieve the desired graded structure the foil may be partially masked to restrict the catalyst to the desired region. Using this procedure structures such as seen in FIGS. 1(a), 11(b), 1(c) and 1(d) may be prepared by spraying or painting onto the foil. The washcoat can be applied to one side only of the metal foil or to both sides.

It should be noted that in these assembly procedures, the catalyst can be applied as a combined mixture of active catalyst (such as palladium) and the high surface area support (Al$_2$O$_3$, ZrO$_2$, and SiO$_2$, etc.). These would be prepared by impregnating the palladium onto the high surface area oxide powder, calcining, then converting to a colloidal sol. In a second method, the high surface area washcoat may be applied first to the monolith or metal foil and fixed in place. Then the catalyst, e.g. palladium, may be applied by the same dipping or spraying procedure. The structure shown in FIG. 1(d) may be prepared by using a single washcoat oxide sol and a single catalyst (palladium) solution and repeating the process.

FIG. 2 shows another series of catalysts where the catalytic coating is made using any of the methods discussed above. In FIG. 2(a) the thicker (and hence, more active) catalytic layer (202) is placed upstream of the thinner catalytic layer (206). Similarly, in FIG. 2(b) a shorter thick layer (208) is applied. Such a configuration might be applied (as opposed to that of FIG. 2(a)) where using a higher activity catalyst or using a higher level of preheat. FIG. 2(c) shows a stepped varied catalyst and FIG. 2(d) shows a constant variation.

The preferred supports for this catalyst structure are metallic. Metallic supports in the form of honeycombs, spiral rolls of corrugated sheet (which may be interspersed with flat separator sheets), columnar (or "handful of straws"), or other configurations having longitudinal channels or passageways permitting high space velocities with a minimal pressure drop are desirable in this service. They are malleable, can be mounted and attached to surrounding structures more readily, and offer lower flow resistance due to the thinner walls than can be readily manufactured in ceramic supports.

Another practical benefit attributable to metallic supports is the ability to survive thermal shock. Such thermal shocks occur in gas turbine operations when the turbine is started and stopped and, in particular, when the turbine must be rapidly shut down. In this latter case, the fuel is cut off or the turbine is "tripped" because the physical load on the turbine—e.g, a generator set—has been removed. Fuel to the turbine is immediately cut off to prevent overspeeding. The temperature in the combustion chambers (where the inventive process takes place) quickly drops from the temperature of combustion to the temperature of the compressed air. This drop could span more than 1000° C. in less than one second. In any event, the catalyst is deposited (or otherwise placed) on the walls within the channels or passageways of the metal support in the amounts specified above. Several types of support materials are satisfactory in this service: aluminum, aluminum containing or aluminum-treated steels, and certain stainless steels or any high temperature metal alloy, including cobalt or nickel alloys where a catalyst layer can be deposited on the metal surface.

The preferred materials are aluminum-containing steels such as those found in U.S. Pat. Nos. 4,414,023 to Aggen et al., 4,331,631 to Chapman et al., and 3,969,082 to Cairns, et al. These steels, as well as others sold by Kawasaki Steel Corporation (River Lite 20-5 SR), Vereinigte Deutchse Metallwerke AG (Alumchrom I RE), and Allegheny Ludlum Steel (Alia-IV) contain sufficient dissolved aluminum so that, when oxidized, the aluminum forms alumina coatings, whiskers, or crystals on the steel's surface to provide a rough and chemically reactive surface for better adherence of the washcoat.

The steels, after alumina whiskers formation, may have palladium compounds applied directly by treatment to incorporate the palladium and any adjunct combustion metal catalyst. The washcoat may be applied using an approach such as is described in the art, e.g., the application of zirconia, titania, silica, or gamma-alumina sols or sols of mixed oxides containing aluminum, silicon, titanium, zirconium, and additives such as barium, cerium, lanthanum, chromium, or a variety of other components. For better adhesion of the washcoat, a primer layer can be applied containing hydrous oxides such as a dilute suspension of pseudo-boehmite alumina as described in U.S. Pat. No. 4,729,782 to Chapman et al. Desirably, the primed surface is then coated with a zirconia suspension, dried, and calcined to form a high surface area adherent oxide layer on the metal surface.

The palladium compounds and any other catalyst precursors may be applied to the zirconia coating although the catalytic materials may be formulated to incorporate them. The washcoat of zirconium may be applied using one or more coats of zirconia sols or sols of mixed oxides containing silicon or titanium and additives such as barium, cerium, lanthanum, chromium, or a variety of other components. Silica works well as such an additive to stabilize against temperature degradation.

The washcoat may be applied in the same fashion one would apply paint to a surface, e.g., by spraying, direct application, dipping the support into the washcoat material, etc.

Aluminum structures are also suitable for use in this invention and may be treated or coated in essentially the same manner. Aluminum alloys are somewhat more ductile and likely to deform or even to melt in the temperature operating envelope of the process. Consequently, they are less desirable supports but may be used if the temperature criteria can be met.

Once the washcoat, palladium, and platinum have been applied to the metallic support and calcined, one or more coatings of a refractory oxide may then be applied as a diffusion barrier to prevent the temperature "runaway" discussed above. This barrier layer can be alumina, silica, zirconia, titania, or a variety of other oxides with a low catalytic activity for oxidation of the fuel or mixed oxides or oxides plus additives similar to those described for the washcoat layer. The barrier layer can range in thickness from 1% of the washcoat layer thickness to a thickness substantially thicker than the washcoat layer, preferably from 10% to 100% of the washcoat layer thickness. The preferred thickness will depend on the operating conditions of the catalyst, including the fuel type, the gas flow velocity, the preheat temperature, and the catalytic activity of the washcoat layer. It has also been found that the application of the diffusion barrier coating only to a downstream portion of the catalyst structure, e.g., 30% to 70% of the length, can provide sufficient protection for the catalyst under certain conditions. As with the washcoat, the barrier layer or layers may be applied using the same application techniques one would use in the application of paint.

The washcoat, catalyst, and diffusion or barrier coat may be applied to all downstream surfaces of a catalyst support such as described herein, or may be applied only to a surface opposite a non-coated surface. For instance, the spiral corrugated structure noted above may be coated on one side or on both sides with the washcoat, catalyst, and diffusion barrier coat. The treated corrugated structure may then be rolled into a monolith. A separator sheet of similar material may also be coated on one or both sides with the catalytic material and rolled along with the corrugated sheet into the spiral monolith. In any event, the surface in the monolith having the catalyst placed thereon produces heat during the combustion process. This heat may pass to the gas flowing by or may be conducted through the catalyst structure to the adjacent non-catalytic—and hence, cooler—surface. From there the heat would pass into the non-combusted gas passing along that surface. This allows control of the temperature of the catalytic surface of the catalyst structure by an integral heat exchange without resorting to such measures as air dilution or extraneous heat exchange structures. Such a control might be desirable where, for instance, the preheat temperature of the inlet gas is quite high and the gas flow rate is unstable.

This catalyst structure should be made in such a size and configuration that the average linear velocity of the gas through the longitudinal channels in the catalyst structure is greater than about 0.2 m/second throughout the catalytic structure and no more than about 40 m/second. This lower limit is greater than the flame front speed for methane and the upper limit is a practical one for the type of supports currently commercially available. These average velocities may be somewhat different for fuels other than methane.

THE PROCESS

This process may be used with a variety of fuels and at a broad range of process conditions.

Although normally gaseous hydrocarbons, e.g., methane, ethane, and propane, are highly desirable as a source of fuel for the process, most carbonaceous fuels capable of being vaporized at the process temperatures discussed below are suitable. For instance, the fuels may be liquid or gaseous at room temperature and pressure. Examples include the low molecular weight aliphatic hydrocarbons mentioned above as well as butane, pentane, hexane, heptane, octane, gasoline, aromatic hydrocarbons such as benzene, toluene, ethylbenzene, and xylene; naphthas; diesel fuel and kerosene; jet fuels; other middle distillates; heavier fuels (preferably hydrotreated to remove nitrogenous and sulfurous compounds); oxygen-containing fuels such as alcohols including methanol, ethanol, isopropanol, butanol, or the like; and ethers such as diethlyether, ethyl phenyl ether, MTBE, etc. Low-BTU gases such as town gas or syngas may also be used as fuels.

The fuel is typically mixed into the combustion air in an amount to produce a mixture having an adiabatic combustion temperature greater than the temperature achieved by this inventive process. Preferably the adiabatic combustion temperature is above 900° C., most preferably above 1000° C. Non-gaseous fuels should be at least partially vaporized prior to their contacting the catalyst zone. The combustion air may be at atmospheric pressure or lower ($-0.25$ atm) or may be compressed to a pressure of 35 atm or more. Stationary gas turbines, which ultimately could use the gas produced by this process, often operate at gauge pressures in the range of eight atm to 17 atm. The process uses a catalytic amount of a palladium-containing material on a catalyst, preferably metal, support with low resistance to gas flow.

The fuel/air mixture supplied to the catalyst should be well mixed and the gas inlet temperature may be varied depending on the fuel used. This temperature may be achieved by preheating the gas through heat exchange or by adiabatic compression.

The bulk outlet temperature of the partially combusted gas leaving the zone containing the catalyst and the wall temperature of the catalyst will be at temperatures significantly lower than the adiabatic or combustion temperature of the gas. Generally, neither temperature will be more than about 800° C., preferably no greater than about 750° C. In addition, the catalyst temperature should not exceed 1000° C. and preferably not exceed 950° C. These temperatures will depend on a variety of factors including the pressure of the system, the partial pressure of the oxygen, the calorific value of the fuel, and the like. Nevertheless the catalyst will partially combust the fuel but will limit the ultimate temperature to a value lower than the adiabatic combustion temperature.

EXAMPLES

These examples show the production of catalysts within the scope of the invention and its use in the inventive process. Comparative catalysts and processes are also shown.

EXAMPLE 1

This example shows the preparation of palladium/-$ZrO_2$-cordierite catalyst with graded palladium concentration and a comparative non-graded catalyst.

EXAMPLE 1(a)

A 125 g amount of $ZrO_2$ having a surface area of 45 $m^2$/gm was impregnated with 45 ml of a solution containing 0.0834 g palladium/ml. This solution was prepared by dissolving $Pd(HN_3)_2(NO_2)_2$ in nitric acid. The palladium/$ZrO_2$ mixture was dried and calcined at 500° C.

A polymer lined ball mill was loaded with 125 g of the palladium/$ZrO_2$ mixture, 230 ml of water, 2.0 ml 70% $HNO_3$ (nitric acid), and $ZrO_2$ media.

A sample of 50 ml of the resulting sol was mixed with an additional 36 ml of 0.0834 g palladium/ml solution, the pH adjusted to 9.0 with $NH_4OH$, and 0.64 g hydrazine added with stirring. The palladium was reduced over a period of several hours. This sol (after full calcination) produced a washcoat containing 13.6% palladium on $ZrO_2$.

A cordierite monolith with 100 cells/$in^2$ (2 inches in diameter by 2 inches long) was dipped into the above palladium/$ZrO_2$ sol, the excess sol was blown from the channels with a stream of air, and the monolith was dried and calcined at 850° C. The resulting single coat had 7.69% palladium/$ZrO_2$ loading and 1.03% palladium loading on the monolith.

This catalyst was again dipped in the palladium/-$ZrO_2$ sol but only to a depth of 12 mm, the excess sol was blown from the channels, and the monolith was dried and calcined. The palladium concentration on this monolith was 4.2% palladium on the 12 mm inlet section and 1.0% palladium on the 39 mm outlet portion. The average palladium concentration was 1.8% palladium.

EXAMPLE 1(b)

This example shows a non-graded palladium/$ZrO_2$-cordierite catalyst for comparison.

Another cordierite monolithic structure was dipped and blown out using a process similar to that shown in Example 1(a). The final catalyst was calcined at 850° C. The final catalyst had a relatively uniform palladium concentration of 1.9% from inlet to outlet.

EXAMPLE 2

This example compares the relative activities of the two catalysts. The two catalysts were subjected to a test in which the methane and air were preheated. The preheat temperature was constantly increased beginning at 325° C. and outlet temperatures for the partially combusted gas and a variety of internal temperatures were measured and recorded.

The catalysts were separately loaded into an adiabatic reactor. Air was introduced at a rate of 800 standard liters per minute (SLPM) and methane was introduced at 36 SLPM.

EXAMPLE 2(a)

Figure 3:
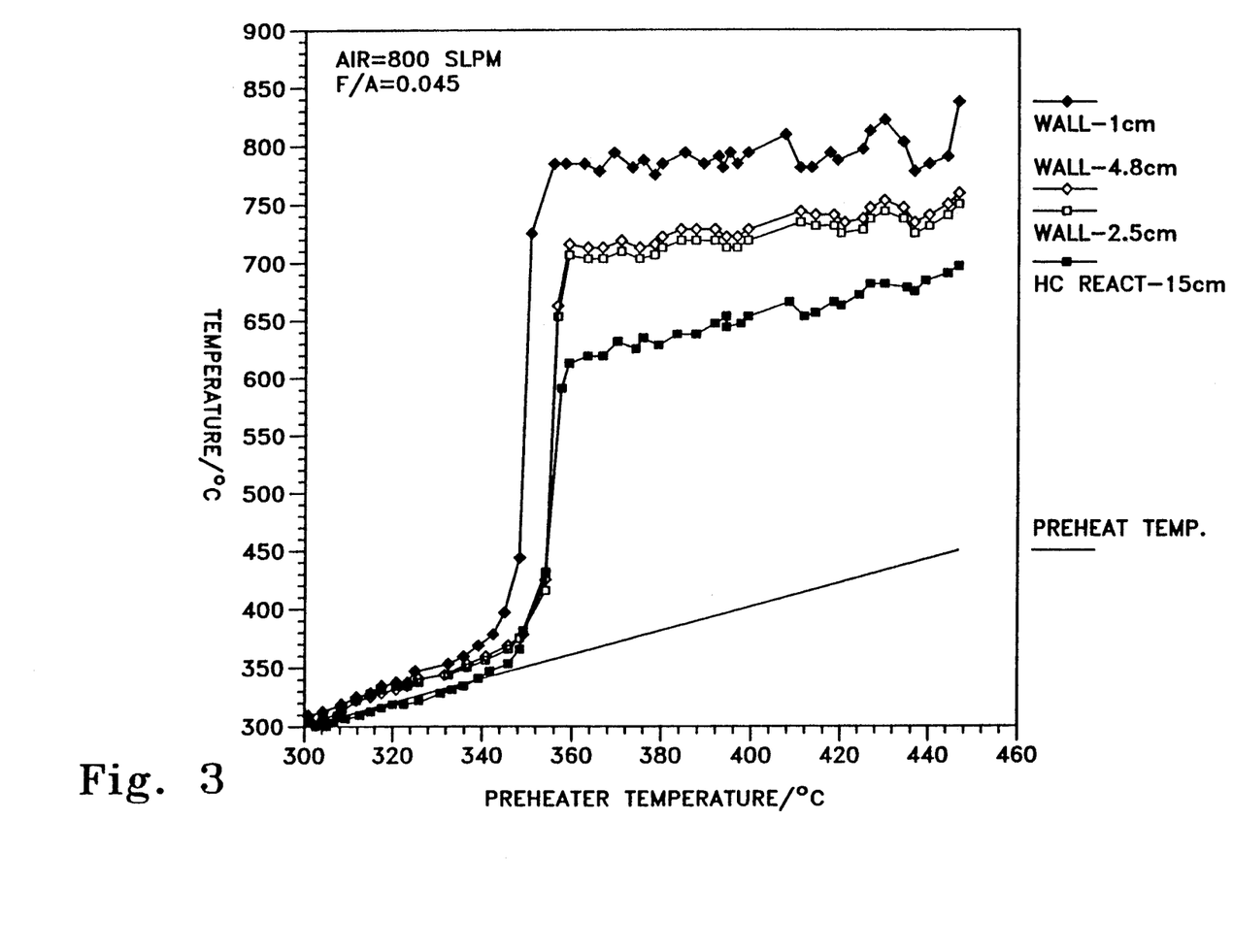
FIGS. 3 and 4 are temperature graphs showing the operation of the invention and comparative catalyst properties.

As may be seen in FIG. 3, at 350° C. preheat the Example 1(a) graded catalyst lit-off and became active. The monolith wall temperature rose to 780° C. and the outlet gas temperature stabilized at about 550° C. As the preheat was continually increased, the catalyst outlet was visually uniform in temperature and appeared to be a dull red color. At a preheat temperature of 448° C., a bright white spot appeared as a portion of the catalyst increased in temperature to above 800° C. The white region began to grow in size and the fuel was cut off to prevent destruction of the catalyst.

This graded catalyst had an operating window between 350° C. and 448° C. or a 98° C. span.

EXAMPLE 2(b)

Figure 4:
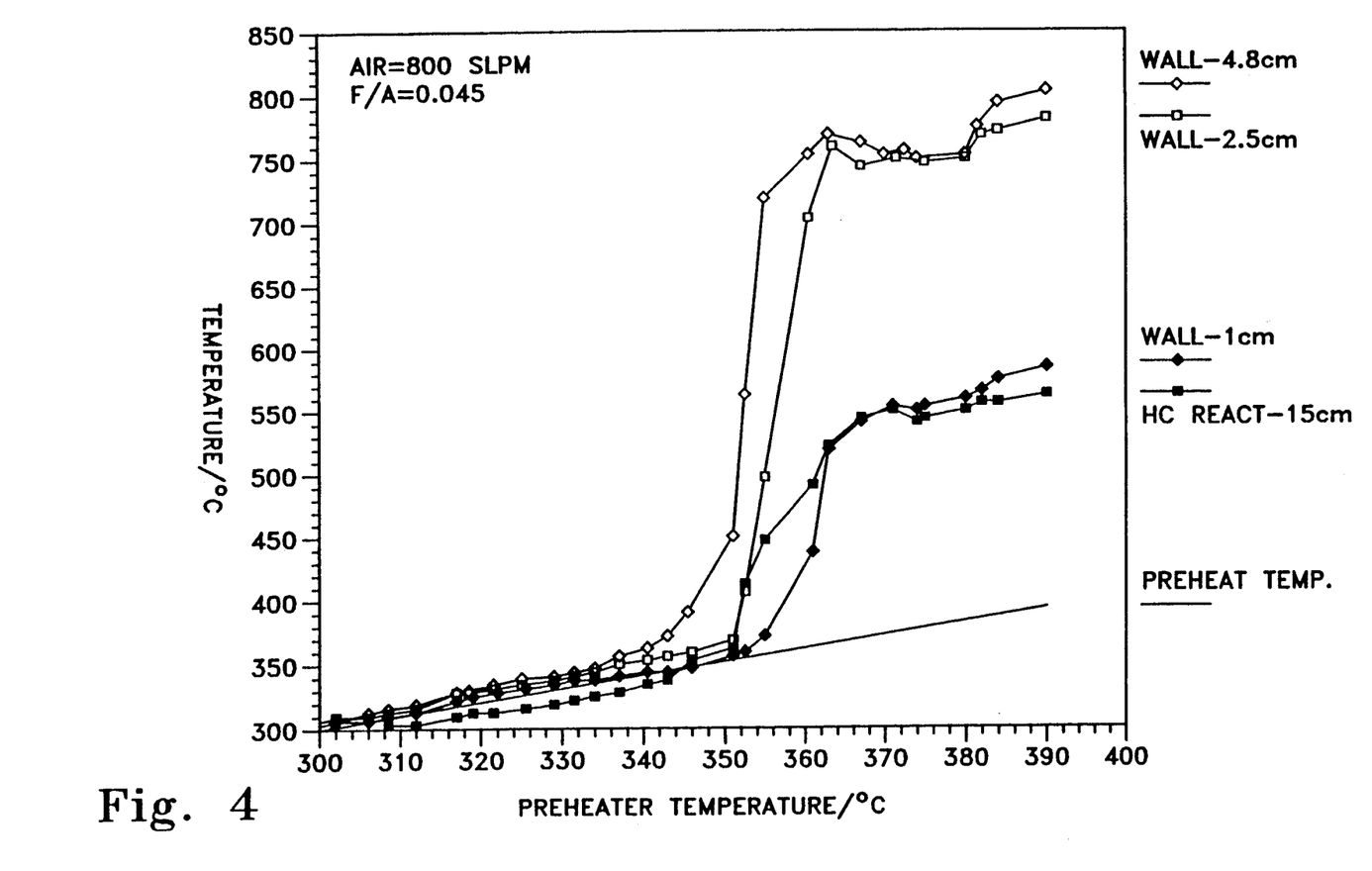

The comparison catalyst from Example 1(b) was tested in a similar fashion. As may be seen in FIG. 4, this catalyst lit-off at approximately 350° C. and exhibited a hot spot (>800° C.) at a preheat temperature of about 390° C. This catalyst had a window between 350° C. and 390° C. or only a span of about 40° C.

The graded catalyst had a much larger operating window even though both catalysts had the same palladium loading.

The invention has been disclosed both by description and by the use of examples. The examples are only examples and must not be used to limit the invention in any way. Furthermore one having ordinary skill in this art would be able to determine equivalents to the invention described here but outside the literal scope of the appended claims. We also consider those equivalents to be part of our invention.

We claim as our invention:

1. A partial combustion comprising the steps of:
   a. mixing an amount of an oxygen containing gas with a combustible fuel to produce a combustible gas mixture having an adiabatic combustion temperature, and
   b. passing the combustible gas mixture into a partial combustion zone containing a catalyst configuration comprising a support having longitudinal passageways with a leading zone containing a relatively higher activity palladium-containing catalyst containing a relatively higher concentration of palladium and a trailing zone containing a relatively lower activity palladium-containing catalyst containing a relatively lower concentration of palladium, the passageways adapted for the passage of the combustible gas from the leading zone to the trailing zone and for the partial combustion of the combustible gas mixture to produce a partially combusted exhaust gas having a bulk temperature and a catalyst temperature less than the adiabatic combustion temperature of the combustible gas mixture.

2. A partial combustion comprising the steps of:
   a. mixing an amount of an oxygen containing gas with a combustible fuel to produce a combustible gas mixture having an adiabatic combustion temperature, and b. passing the combustible gas mixture into a partial combustion zone containing a catalyst configuration comprising a support having longitudinal passageways with a leading zone containing a relatively higher activity palladium-containing catalyst containing and a trailing zone containing a relatively lower activity palladium-containing catalyst, the higher activity in the leading zone being accomplished by using palladium in a relatively thicker layer than in the trailing zone, the passageways adapted for the passage of the combustible gas from the leading zone to the trailing zone and for the partial combustion of the combustible gas mixture to produce a partially combusted exhaust gas having a bulk temperature and a catalyst temperature less than the adiabatic combustion temperature of the combustible gas mixture.

3. The process of claim 1 where the trailing zone additionally comprises a diffusion barrier on the palladium-containing catalyst.

4. The process of claim 3 where the catalyst support comprises a material selected from the group of metal and a metal having an oxide coating.

5. The process of claim 4 where the catalyst support comprises a ferrous alloy.

6. The process of claim 3 where the catalyst support comprises a ferrous alloy coated by a non-catalytic oxide, a refractory metal oxide, or mixtures thereof.

7. The process of claim 3 where the catalyst is at least partially covered by a diffusion barrier comprising a catalytically inactive oxide.

8. The process of claim 7 where the diffusion barrier comprises zirconia.

9. The process of claim 7 where the diffusion barrier layer is a washcoat.

10. The process of claim 6 where the palladium is at least partially covered by a diffusion layer comprising a catalytically inactive oxide.

11. The process of claim 10 where the diffusion barrier comprises zirconia.

12. The process of claim 11 where the diffusion layer is a washcoat.

13. The process of claim 3 where the combustible gas comprises methane and the combustible gas mixture is passed into the partial oxidation zone at a temperature of at least about 325° C.

14. The process of claim 13 where the partial combustion zone has a gauge pressure between −0.25 atm and 17 atm.

15. The process of claim 3 where the catalyst support having longitudinal passageways is in the form of a honeycomb, tubes, or rolled corrugation.

16. The process of claim 15 where only a portion of the longitudinal passageway surfaces contain catalyst.

17. The process of claim 16 where the portion of the longitudinal passageways surfaces containing catalyst are adjacent to passageway surfaces not containing palladium and those surfaces are in integral heat exchange relationship to each other.

18. A partial combustion process comprising the steps of:

a. mixing an amount of air and methane to produce a combustible gas mixture having an adiabatic combustion temperature, and b. passing the combustible gas mixture into a combustion zone containing a catalyst support of a spiral of corrugated ferrous alloy sheet having longitudinal passageways with a leading zone containing a relatively higher activity palladium-containing catalyst and a trailing zone containing a relatively lower activity palladium-containing catalyst, the higher activity of the leading zone being accomplished by using palladium at a relatively higher concentration than the palladium concentration in the trailing zone, the passageways adapted for the passage of the combustible gas from the leading zone to the trailing zone and for the partial oxidation of the combustible gas mixture to produce a partially oxidized exhaust gas having a bulk temperature and a catalyst temperature less than the adiabatic combustion temperature of the combustible gas mixture.

19. A partial combustion process comprising the steps of:

a. mixing an amount of air and methane to produce a combustible gas mixture having an adiabatic combustion temperature, and b. passing the combustible gas mixture into a combustion zone containing a catalyst support of a spiral of corrugated ferrous alloy sheet having longitudinal passageways with a leading zone containing a relatively higher activity palladium-containing catalyst and a trailing zone containing a relatively lower activity palladium-containing catalyst, the higher activity of the leading zone being accomplished by using palladium in a relatively thicker layer than in the trailing zone, the passageways adapted for the passage of the combustible gas from the leading zone to the trailing zone and for the partial oxidation of the combustible gas mixture to produce a partially oxidized exhaust gas having a bulk temperature and a catalyst temperature less than the adiabatic combustion temperature of the combustible gas mixture.

20. The process of claim 18 where the trailing zone additionally comprises a diffusion barrier on the palladium-containing catalyst.

21. The process of claim 18 where the combustible gas mixture is preheated to a temperature of more than about 325° C. prior to passage into the combustion zone.

22. The process of claim 18 where only a portion of the surfaces of the longitudinal passageways comprise the catalyst.

23. The process of claim 22 where the portion of the surfaces of the longitudinal passageway surfaces containing the catalyst are adjacent to passageway surfaces not containing the catalyst and those surfaces are in integral heat exchange relationship to each other.

* * * * *